(12) United States Patent
Polimeni, Jr.

(10) Patent No.: US 11,602,862 B2
(45) Date of Patent: Mar. 14, 2023

(54) PNEUMATIC HOSE ASSEMBLY FOR A ROBOT

(71) Applicant: Energid Technologies, Bedford, MA (US)

(72) Inventor: Ralph F. Polimeni, Jr., Reno, NV (US)

(73) Assignee: ENERGID TECHNOLOGIES CORPORATION, Bedford, MA (US)

( * ) Notice: Subject to any disclaimer, the term of this patent is extended or adjusted under 35 U.S.C. 154(b) by 367 days.

(21) Appl. No.: 16/815,764

(22) Filed: Mar. 11, 2020

(65) Prior Publication Data

US 2021/0283789 A1 Sep. 16, 2021

(51) Int. Cl.
*B25J 15/06* (2006.01)
*B25J 19/00* (2006.01)
*B25J 18/02* (2006.01)

(52) U.S. Cl.
CPC ....... *B25J 19/0025* (2013.01); *B25J 15/0616* (2013.01); *B25J 18/025* (2013.01)

(58) Field of Classification Search
CPC ............... B25J 19/0025; B25J 19/0029; B25J 19/0033; B25J 19/0041; B25J 15/0616–0691; B25B 11/005
USPC .......................................................... 269/20
See application file for complete search history.

(56) References Cited

U.S. PATENT DOCUMENTS

| | | | | |
|---|---|---|---|---|
| 3,546,656 A | * | 12/1970 | Pritulsky | H01R 9/16 439/191 |
| 4,469,729 A | * | 9/1984 | Watanabe | C08J 5/124 474/271 |
| 5,777,267 A | * | 7/1998 | Szydel | B25J 19/0025 174/72 A |
| 7,680,300 B2 | | 3/2010 | Chang et al. | |
| 8,301,421 B2 | | 10/2012 | Bacon et al. | |
| 8,408,918 B2 | | 4/2013 | Hu et al. | |
| 8,428,781 B2 | | 4/2013 | Chang et al. | |
| 9,357,708 B2 | | 6/2016 | Chang et al. | |
| 10,078,712 B2 | | 9/2018 | Bacon et al. | |
| 10,445,442 B2 | | 10/2019 | English et al. | |
| 2006/0008119 A1 | | 1/2006 | Chang et al. | |
| 2006/0209019 A1 | | 9/2006 | Hu | |
| 2009/0289591 A1 | | 11/2009 | Kassow et al. | |
| 2010/0152899 A1 | | 7/2010 | Chang et al. | |

(Continued)

OTHER PUBLICATIONS

Stretch Hose, 2016 Hi-Tech Duravent; https://web.archive.org/web/20170107171937/http://www.hitechduravent.com:80/stretch-hose-flexible-hose (Year: 2016).*

(Continued)

*Primary Examiner* — Gerald McClain (74) *Attorney, Agent, or Firm* — Burns & Levinson LLP (57) ABSTRACT

An example robot includes inks comprising a first link and a second link, together with joints among the links. A joint between the first link and the second link is configured to enable relative movement between the first link and the second link. An end effector is connected in series with one of the joints. A hose assembly is connected to the end effector. The hose assembly includes a hose having a first end for making connection to a vacuum source and a second end for making connection to the end effector. An elasticity of the hose assembly is greater along the length of the hose assembly than along the cross-section of the hose assembly.

24 Claims, 11 Drawing Sheets

(56) References Cited

U.S. PATENT DOCUMENTS

| | | |
|---|---|---|
| 2012/0210817 A1 | 8/2012 | Kassow et al. |
| 2013/0079928 A1 | 3/2013 | Søe-Knudsen et al. |
| 2013/0231778 A1 | 9/2013 | Østergaard |
| 2013/0255426 A1 | 10/2013 | Kassow et al. |
| 2015/0199458 A1 | 7/2015 | Bacon et al. |
| 2016/0136805 A1 | 5/2016 | Søe-Knudsen et al. |
| 2017/0057095 A1 | 3/2017 | Oestergaard et al. |
| 2019/0002059 A1* | 1/2019 | Salles ............... B63B 27/28 |
| 2019/0015940 A1* | 1/2019 | Maier ............... B23Q 3/005 |
| 2019/0086907 A1 | 3/2019 | Oestergaard et al. |
| 2020/0055201 A1* | 2/2020 | Joesten ............ B25J 19/0025 |
| 2020/0269416 A1* | 8/2020 | Toothaker ......... B25J 19/0025 |
| 2020/0338728 A1* | 10/2020 | Toothaker ......... B25J 18/00 |
| 2021/0267125 A1* | 9/2021 | Lu .................... B25J 19/023 |
| 2021/0316444 A1* | 10/2021 | Hatano ............. B25J 9/1005 |

OTHER PUBLICATIONS

Williams, Martyn, "Roboden is cable you can stretch",PCWorld from IDGNewsService (IDG), 5 pages. (Oct. 7, 2016) (Year: 2016).*
Stretch Hose, hitechduravent.com, PDF file (Year: 2016).*
Motoman GP20HL, Yaskawa, "Handling & General Applications with the GP-series," PDF file (Year: 2019).*
"Industrial & Commercial Product Catalog," Hi-Tech Duravent, PDF file (Year: 2019).*
Engineering ToolBox, (2004). Friction and Friction Coefficients. [online] Available at: https://www.engineeringtoolbox.com/frictioncoefficients- d_778.html [Accessed Mar. 25, 2020].
Williams Martyn, "Roboden is cable you can stretch", PC World from IDG News Service (IDG). 5 pages. (Oct. 7, 2016).
https://www.avient.com/products/thermoplastic-elastomers/tpe-knowledge-center/tpe-faqs accessed Jul. 11, 2022; (16 pages).

* cited by examiner

PNEUMATIC HOSE ASSEMBLY FOR A ROBOT

TECHNICAL FIELD

This specification relates generally to an example pneumatic hose assembly for a robot.

BACKGROUND

An example robot uses suction to pick-up objects. For example, the robot may include an end effector comprised of a tool to pick-up objects using suction. A vacuum source may generate vacuum pressure to produce the suction at the end effector.

SUMMARY

Described herein are example robots having a vacuum supply hose assembly that can maintain close proximity to a robotic arm at all times during robot operation. The vacuum supply hose assembly may include flexible tubing that can stretch and return to its original shape while maintaining close proximity to the robotic arm. The flexible tubing may also be anchored at both the proximal and distal ends of the robotic arm, while running through guides where needed to maintain proximity to the robot arm. Also described herein are examples of a mechanism at a distal end of the robotic arm that can rotate continuously while receiving an uninterrupted vacuum supply. The mechanism may include a close-coupled slip ring end effector that is configured for use with a pneumatic hose assembly of the type described herein.

An example robot includes links comprising a first link and a second link, together with joints among the links. A joint between the first link and the second link is configured to enable relative movement between the first link and the second link. An end effector is connected in series with one of the joints at a distal end of the robot's arm. A hose assembly is connected to the end effector. The hose assembly includes a hose having a first end for making connection to a vacuum source and a second end for making connection to the end effector. An elasticity of the hose assembly is greater along the length of the hose assembly than along the cross-section of the hose assembly. The example robot may include one or more of the following features, either alone or in combination.

An elasticity of the hose assembly along the hose assembly length may be such that the hose assembly, when stretched, can double in length from a relaxed position. The hose assembly may include an electrical cable embedded therein. The electrical cable may have an elasticity that is at least as great as the elasticity of the length of the hose assembly.

The robot also may include guides along at least some of the links. The guides may be configured to hold the hose assembly at least partly against the links while permitting the hose assembly to stretch to accommodate movements of a joint, a link, or both a joint and a link. Each joint may be configured for rotation to cause at least partial rotation of the first link relative to the second link. The at least partial rotation causes the hose assembly to stretch. A joint may be configured to cause the first link to move translationally relative to the second link, where translational movement of the first link relative to the second link causes the hose assembly to stretch. The translational movement may include at least one of telescopic movement, sliding movement, or linear movement.

The links and the joints may be comprised of one or more first materials and the hose assembly may be comprised of a second material. A coefficient of static friction between the one or more first materials and the second material may be less than 0.2.

The robot may include the vacuum source or the vacuum source may be apart from the robot. The vacuum source may be controlled, and the hose assembly may be configured, to provide substantially constant pressure to the end effector.

The end effector may include rigid tubing and a slip ring device connected to a flange that itself is connected to one of the joints. The slip ring device is around at least part of the rigid tubing. The slip ring device may include a fixed element connected to the flange and a rotary element connected to the fixed element and configured for rotation around a center line of the fixed element. The slip ring device may be configured for connection to the hose assembly to produce vacuum in the rigid tubing. The slip ring device may include a locking mechanism to connect the fixed element and the rotary element to the flange and around the rigid tubing. The slip ring device may include one or more sealing elements configured and arranged to address vacuum leaks within the slip ring device. The slip ring device may include one or more of bearings or dry film lubricant coating between the rotary element and the fixed element to support rotation of the rotary element relative to the fixed element.

The hose may be an inner layer of the hose assembly and may be made of rubber. The hose assembly may include an outer layer that surrounds the hose. A coefficient of static friction between the inner layer and the outer layer approaches one. The outer layer may include at least one of spandex or nylon.

The outer layer may include a sleeve around all or part of the inner layer hose. For example, the outer layer may include a stretch fabric sleeve that surrounds an entire length of the inner layer. The sleeve and the hose may be comprised of different materials. The robot may have a surface made of aluminum. A coefficient of static friction between the surface of the robot and the sleeve may be less than 0.2. The hose, which is under the outer layer or sleeve, may include at least one of: a coiled support structure, braided elastomer, parallel elastomer, or a stretch tubing having a thickness configured so as not to collapse under atmospheric pressure when vacuum is applied to the stretch tubing.

The hose assembly may include terminus fittings at a first end and a second end thereof. The end effector may include one or more of a vacuum cup, a vacuum fixture, or a vacuum actuated gripping device.

Any two or more of the features described in this specification, including in this summary section, can be combined to form implementations not specifically described herein.

The example robots described herein, or portions thereof, can be controlled by a computer program product that includes instructions that are stored on one or more non-transitory machine-readable storage media, and that are executable on one or more processing devices to control (e.g., coordinate) the operations described herein. The example robots described herein, or portions thereof, can be implemented as an apparatus or electronic system that can include one or more processing devices and memory to store executable instructions to implement various operations.

The details of one or more implementations are set forth in the accompanying drawings and the description below.

Other features, objects, and advantages will be apparent from the description and drawings, and from the claims.

DESCRIPTION OF THE DRAWINGS

Like reference numerals in different figures indicate like elements.

DETAILED DESCRIPTION

Described herein are examples of robots that pick-up and hold objects using suction. An example of such a robot may include multiple links. Each pair of adjacent links may be connected by one or more joints. The links and joints may constitute components of a robotic arm. The joints are computer-controlled to move—for example to rotate—in order to move the links and thus the arm. A pneumatic hose connects to an end effector on the robot and to a vacuum source. Vacuum pressure generated by the vacuum source produces suction at the pneumatic hose and, thus, at the end effector. This suction enables the end effector to pick-up and to hold objects.

During movement of the joints and links, pneumatic hoses may be susceptible to tangling or stretching, which can affect their ability to convey sufficient vacuum pressure to the end effector. For example, during normal robotic arm operation, a joint may rotate—for example, ±360°—while the distal-most joint may have continuous rotation capabilities. Because of these motions, heretofore, slack had to be maintained in a pneumatic hose to avoid binding and tearing. This slack can create loops in the pneumatic hose that can extend well beyond close proximity to the robotic arm. During operation, these loops can snag causing damage to the pneumatic hose, to nearby objects, to sensors, to placement fixtures, to vacuum fittings, and to an end effector.

Accordingly, described herein is pneumatic hose assembly that includes an inner layer hose and an outer sleeve. The hose assembly has an elasticity that is greater along its length than along its cross-section. Because the hose assembly has an elasticity that is greater along its length than along its cross-section, the hose assembly can stretch and conform to movements of the joints and the links without proportionate reductions in its cross-sectional area. As a result, the cross-sectional area of the hose assembly is still large enough to convey sufficient vacuum pressure to the end effector to allow the end effector to pick-up and to hold objects. Guides are configured to hold the hose assembly at least partly against the links while permitting the hose assembly to stretch to accommodate movements of a joint, a link, or both a joint and a link. The guides, along with the longitudinal elasticity of the hose assembly, reduce the chances that the hose assembly will become snagged or tangled during movement the robot's operation. As a result, there is a reduced chance of damage to the hose assembly itself, to nearby objects, to sensors, to placement fixtures, to vacuum fittings, and to the end effector.

FIGS. 1 to 5 and 11 show an example of a pick-and-place robot 10 that may include a pneumatic hose assembly of a type described herein. The pneumatic hose assembly, however, is not limited to use with robots of this type as explained herein.

Figure 1:
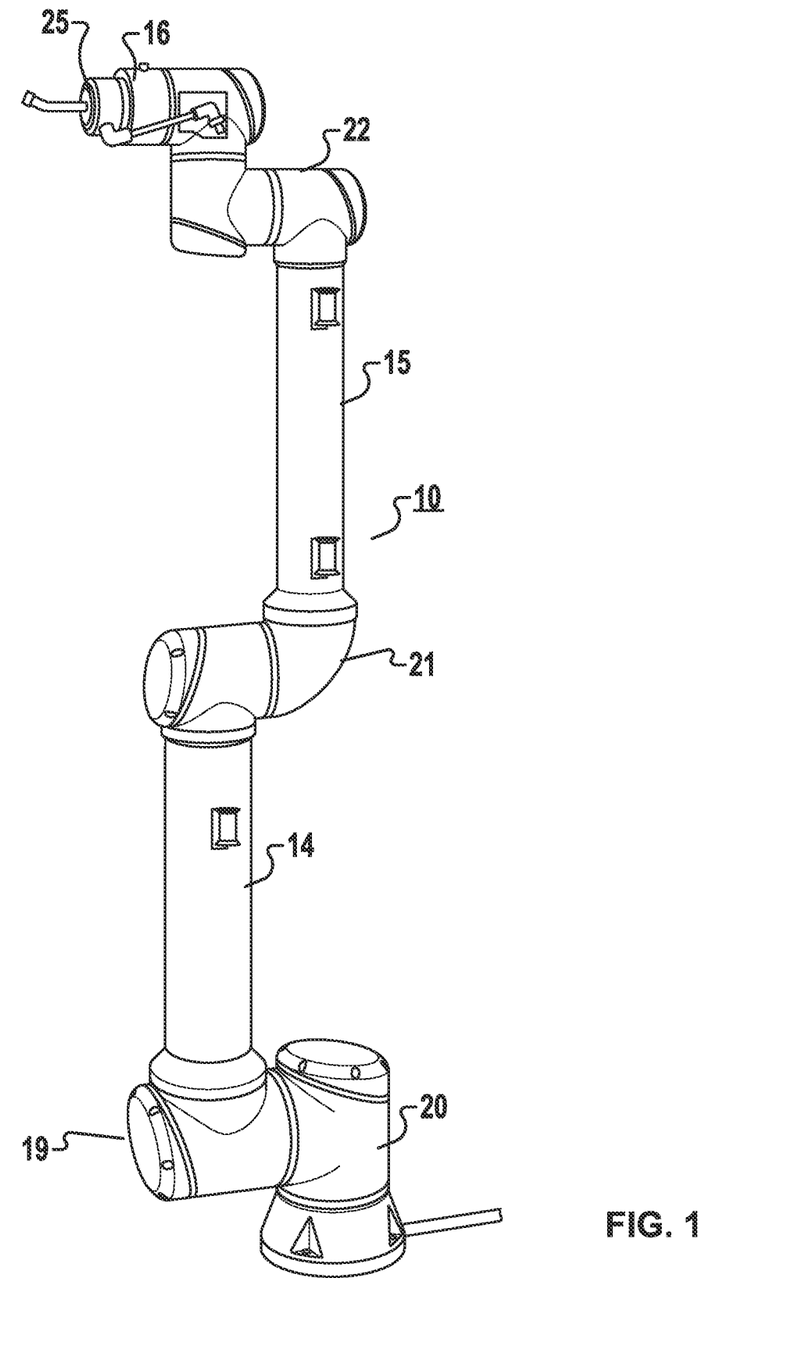
FIG. 1 is a perspective view of an example robot.
Figure 2:
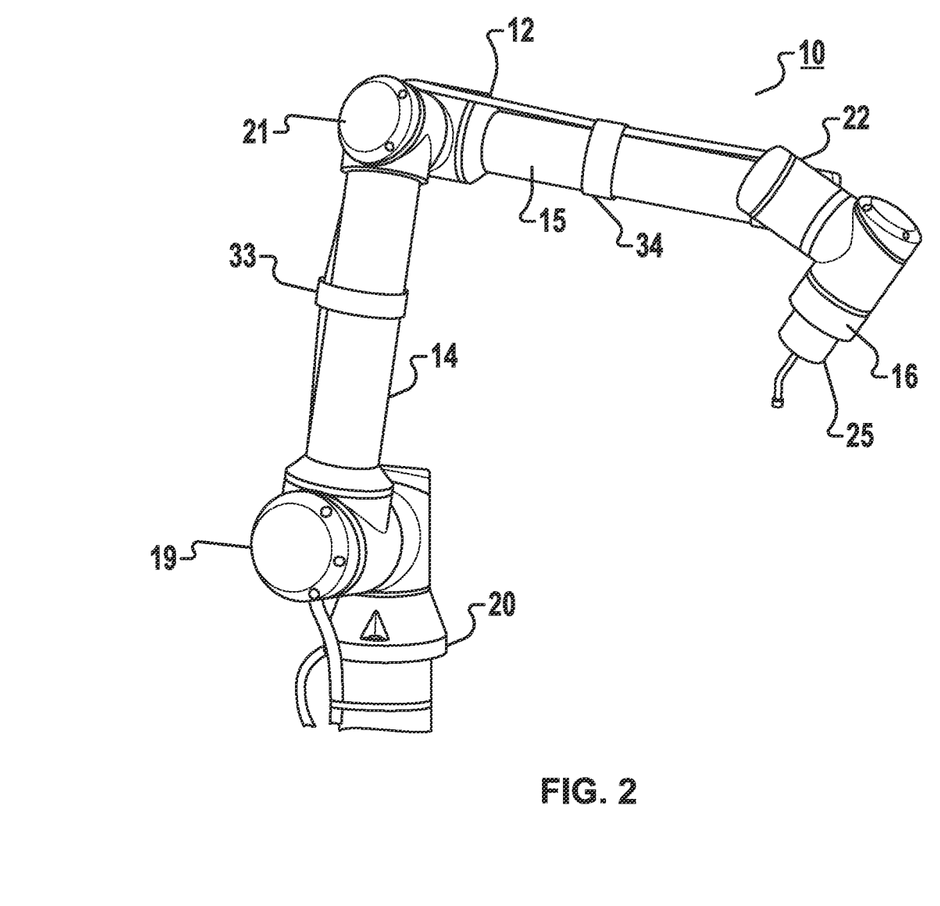
FIGS. 2 to 5 are perspective views of the example robot in different poses and having an example pneumatic hose assembly attached thereto.
Figure 3:
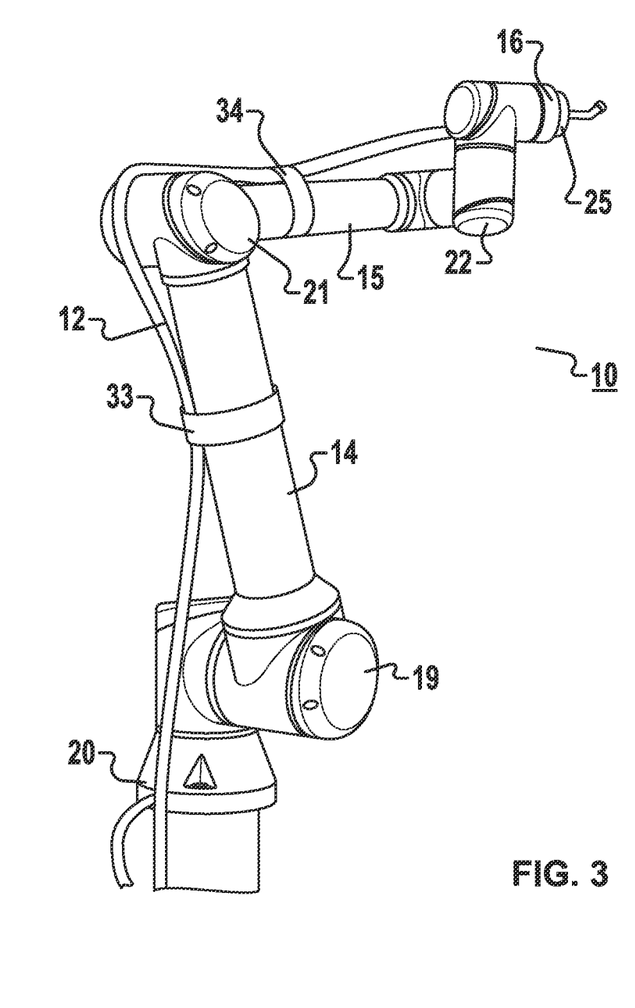
Figure 4:
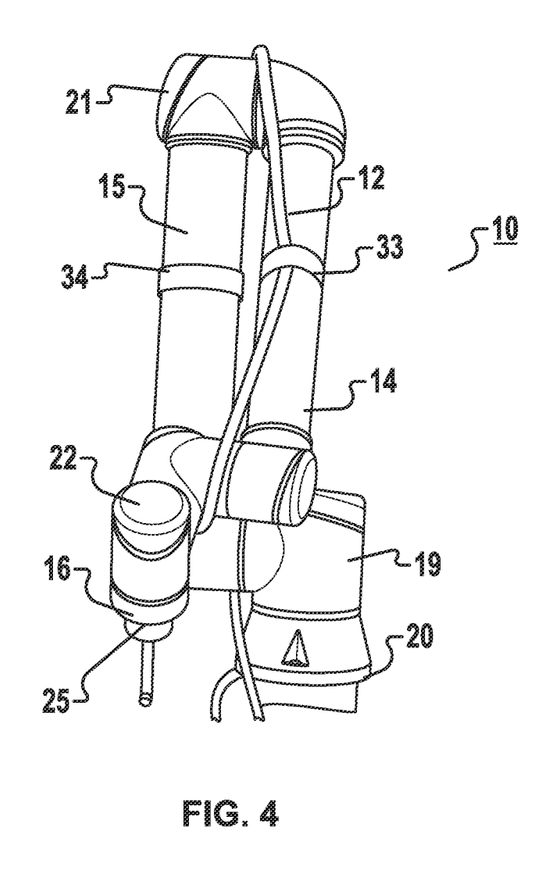
Figure 5:
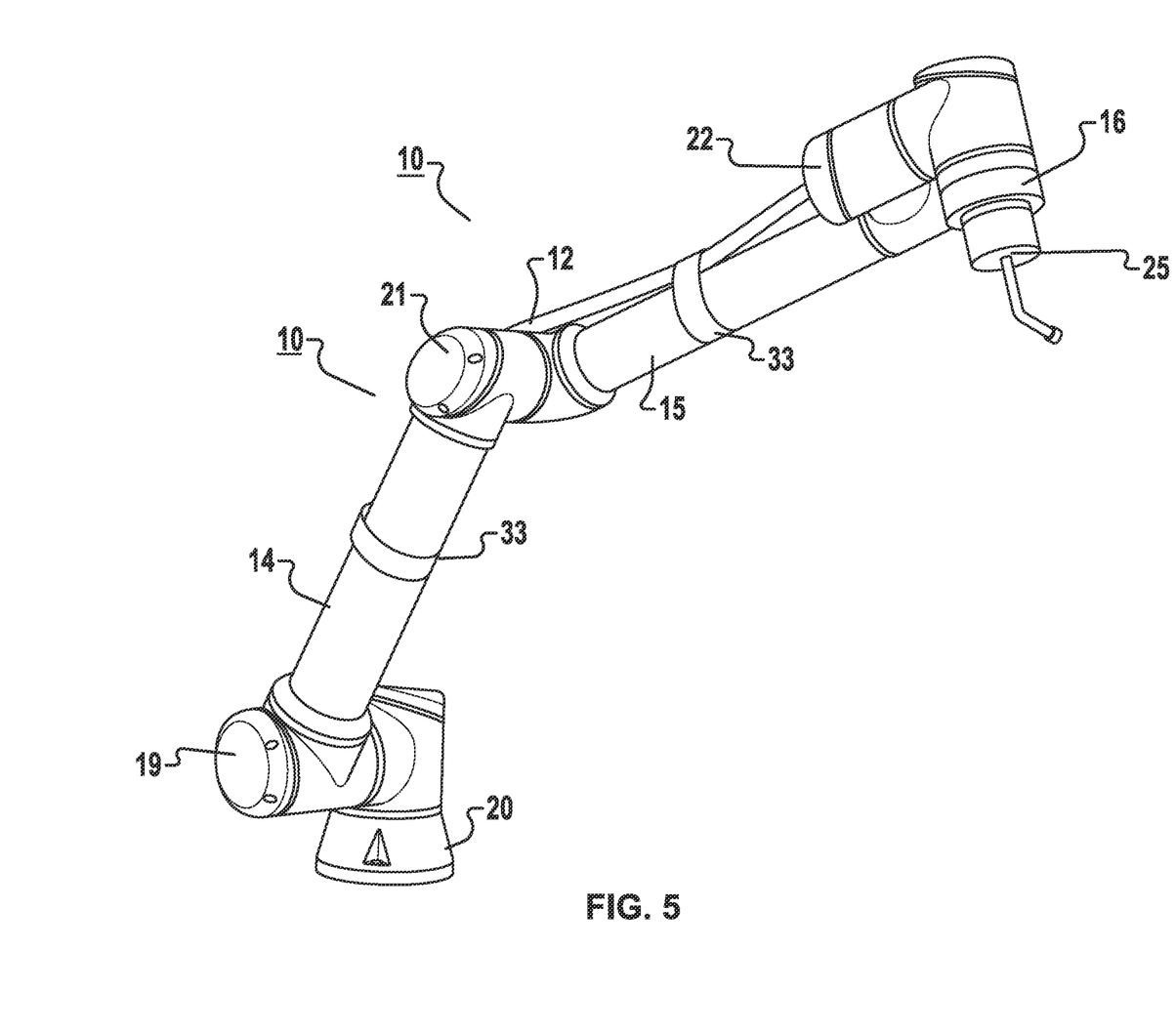
Figure 11:
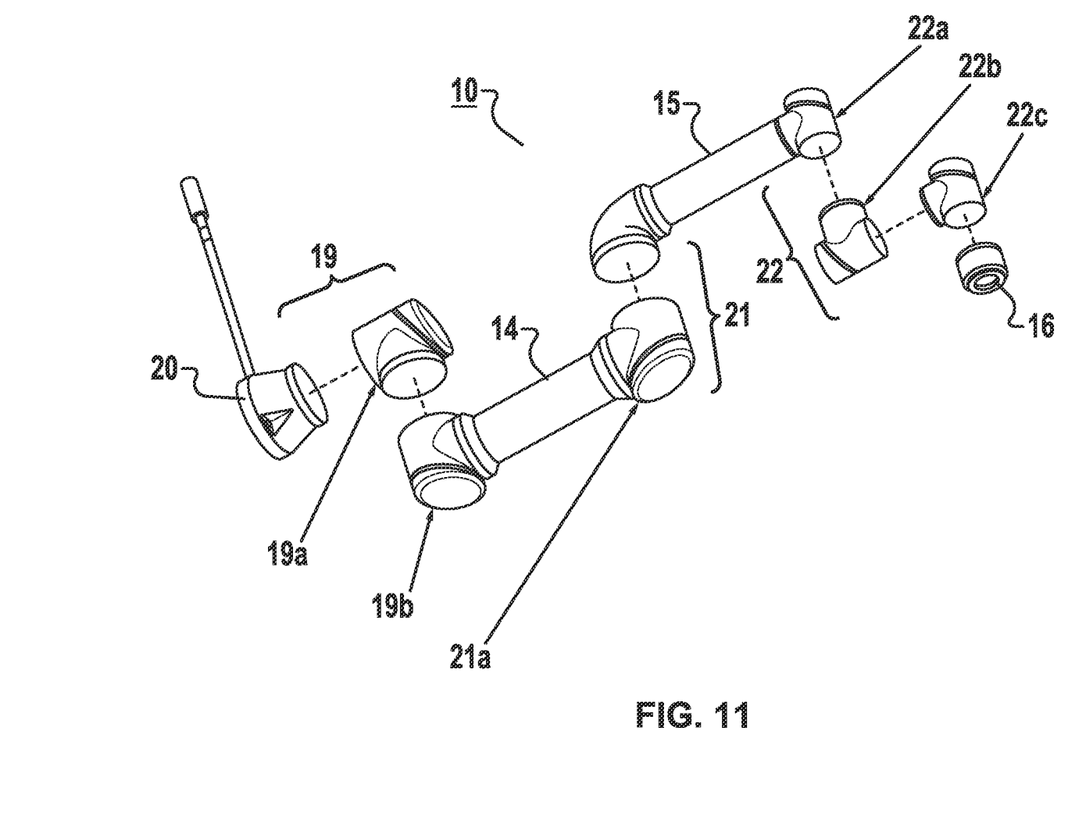
FIG. 11 is an exploded perspective view of the example robot of FIG. 1.

FIGS. 1 to 5 show the same robot 10 in different poses, although FIG. 1 does not include the pneumatic hose assembly described herein. Accordingly, of this series of figures, FIGS. 1, 2, and 11 will initially be referenced to describe the components of robot 10. Robot 10 includes multiple links, in this example, first link 14, second link 15, and tool flange 16. Additional or fewer links may be included in some implementations. Robot 10 also includes multiple joint assemblies arranged among the links. Joint assembly 19 connects link 14 to base 20, and joint assembly 21 connects link 14 and 15. Joint assembly 22 connects link 15 to a tool flange 16 containing end effector 25. In an example, a joint assembly may include one or more joints that may be connected and move, e.g., rotate relative to each other. In this example, as shown in FIG. 11, joint assembly 19 includes base joint 19a and shoulder joint 19b; joint assembly 21 includes elbow joint 21a; and joint assembly 22 includes wrist joint 22a, wrist joint 22b, and wrist joint 22c. In an example, an end effector includes a device connected to the most distal robot link that is configured to interact with the environment. Links, the joints, and/or the end effector may together form a robotic arm that is moveable and computer-controllable to pick-up an object at one location and to place the object at a different location.

Robot 10 also includes a pneumatic hose assembly connected to end effector 25 as described in more detail below. The pneumatic hose assembly has a first end for making connection to a vacuum source (not shown) and a second for making connection to end effector 25. In this example, the joints of the robot are configured for rotation to cause at least partial rotation of the links attached thereto, which causes hose assembly 12 to stretch. In some example robots, a link may rotate through ±180°, ±360°, or ±720°. In some links, such as the most distal link, rotation may be continuous, for example, not limited. An elasticity of the hose assembly is greater along the length of the hose assembly between its first and second ends than along the cross-section of the hose assembly. In general, elasticity includes the ability of the hose assembly to stretch or otherwise to change or to adapt.

In some implementations, the robot is able to move throughout its full range of motion, including all joint motion, all link motion, and all angular motion, while the pneumatic connection remains through hose assembly 12. Due to the different elasticities of the hose assembly along its longitudinal and lateral dimensions, the hose assembly is able to deliver consistent or substantially consistent (e.g., less than 10% variation) vacuum pressure to the end effector, while maintaining its internal pressure relative to atmospheric pressure. Furthermore, due to the different elasticities of the hose assembly along its longitudinal and lateral dimensions, in some implementations the hose assembly is able to maintain or to substantially maintain (e.g., less than 10% variation) its internal volume when stretched. In some implementations, the difference in elasticities of the hose assembly along its longitudinal and lateral dimensions is optimized to maintain a tradeoff between evacuation/pressurization time and the flow rate that the hose assembly is configured to support.

In an example, an elasticity of the hose assembly along the length of the hose assembly is such that the hose assembly, when stretched, can double in length from a relaxed position. In an example, an elasticity of the hose assembly along its length is such that the hose assembly, when stretched, can double in length from a relaxed position without changing (e.g., reducing) an area of the cross-section of the hose assembly by more than 20%, by more than 15%, by more than 10%, by more than 9%, by more than 8%, by more than 7%, by more than 6%, by more than 5%, by more than 4%, by more than 3%, by more than 2%, or by more than 1%. In an example, an elasticity of the hose assembly along the cross-section of the hose assembly is such that a cross-sectional area of the hose assembly changes (e.g., increases) by no more than 50%, by no more than 40%, by no more than 30%, by no more than 20% or by no more than 10% when pressure in the hose assembly changes from atmospheric pressure at sea level (14.696 pounds-per-square-inch or 101.325 kilopascals) to 60 pounds-per-square-inch (413.685 kilopascals). These definitions of elasticity are examples only; others may be used.

Figure 6:
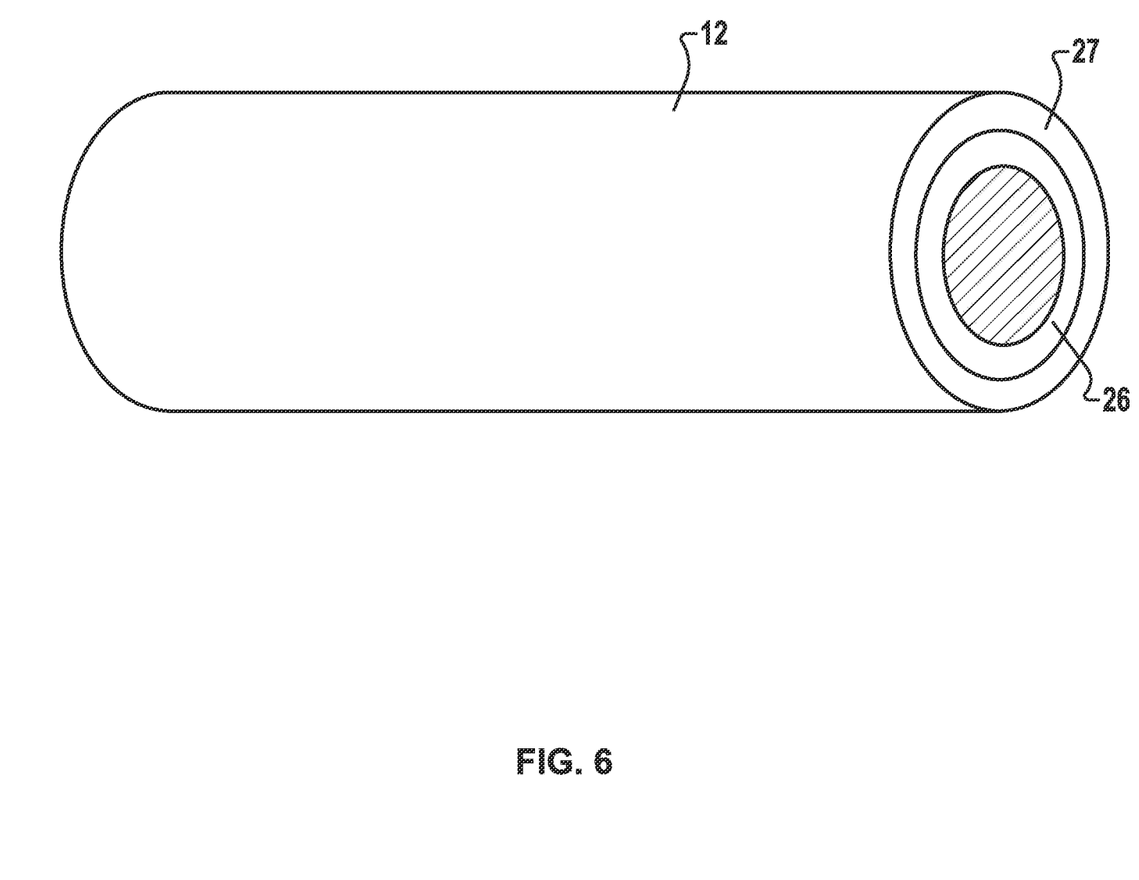
FIG. 6 is a cut-away perspective view of an example pneumatic hose assembly.

Referring to FIG. 6, in some implementations, hose assembly 12 includes an inner layer that includes hose (or tubing) 26 and an outer layer that includes sleeve 27. In some examples, hose 26 includes at least one of: a coiled support structure forming a tension spring, braided elastomer, parallel elastomer, or a stretch tubing having a thickness configured so as not to collapse under atmospheric pressure when vacuum is applied to the stretch tubing. The coiled support structure, braided elastomer, parallel elastomer, or a stretch tubing may be made of rubber or any appropriate type of elastic material and may resist collapse under atmospheric pressure when vacuum is applied to the hose assembly. In some implementations, additional cross-sectional elasticity may be provided to reduce the need for a coiled support structure.

Sleeve 27 may be made of a different material than the hose. For example, the sleeve may include a stretch fabric sleeve that surrounds, in whole or in part, an entire length of the hose. For example, the sleeve may include a stretch fabric sleeve that surrounds, in whole or in part, part of the length of the hose. This stretch fabric sleeve may be configured to provide abrasion protection to the hose assembly while also providing a lower coefficient of friction allowing the hose assembly to slide over obstacles and hose assembly guides, where applicable, relatively easily. In some implementations, the sleeve of the hose assembly may be or include spandex, nylon, or a combination of spandex and nylon. A coefficient of static friction between the hose and the sleeve may be relatively high to ensure that the hose and outer sleeve do not move relative to each other during stretching in either the longitudinal or lateral directions. For example, the coefficient of static friction may be one or may approach one. For example, the coefficient of static friction may be within 5% of one, 4% of one, 3% of one, 2% of one, or 1% of one.

Figure 7:
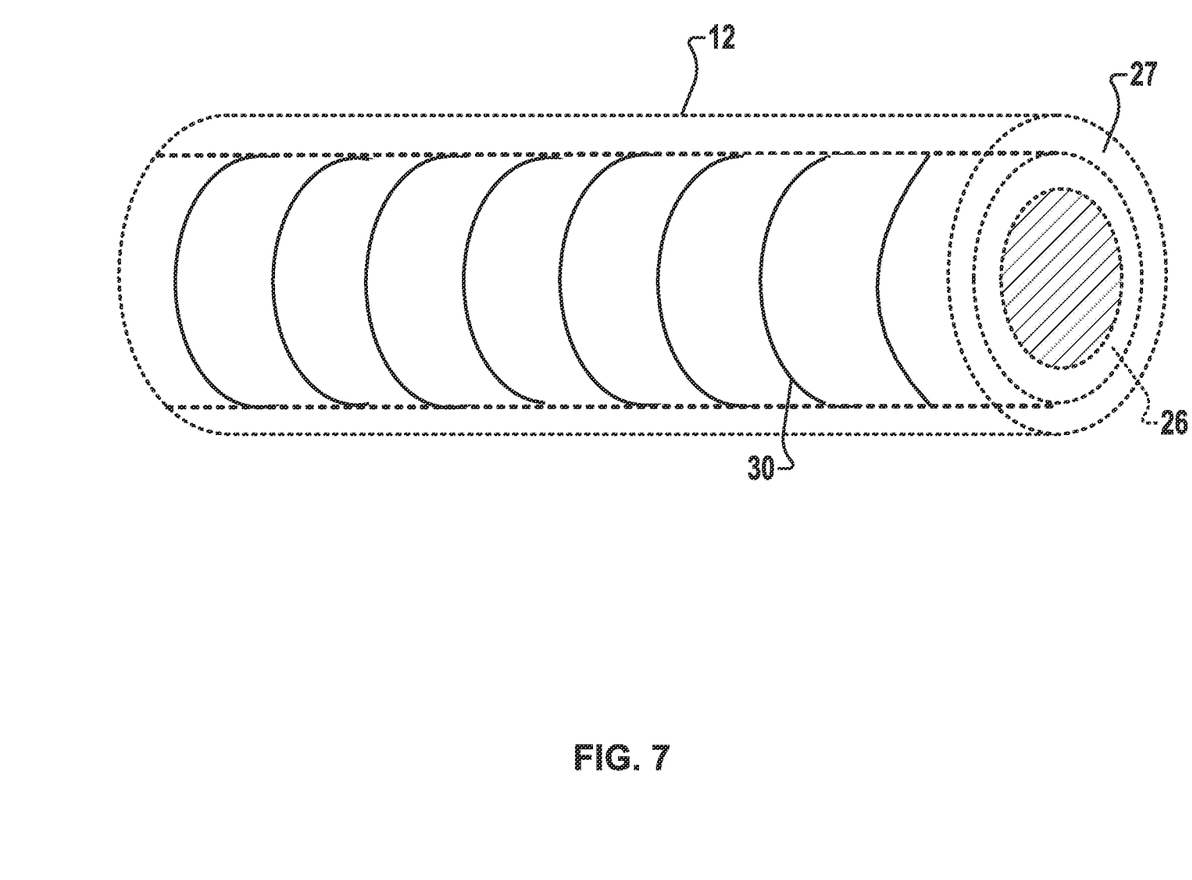
FIG. 7 is a cut-away perspective view of an example pneumatic hose assembly containing an electrical cable.

Referring to FIG. 7, hose assembly 12 may include an electrical cable 30 embedded in the hose assembly. The electrical cable may have an elasticity that is at least as great as the elasticity along the length of the hose assembly. In some implementations, the electrical cable may be between hose 26 and outer sleeve 27 as shown in FIG. 7. For example, the electrical cable may be wrapped around the hose. In some implementations, the electrical cable may be linearly arranged—that is, not wrapped around a part of the hose assembly. The electrical cable may be used to deliver electrical power to the end effector. FIG. 7 shows a single electrical cable; however, in some implementations multiple electrical cables may be embedded in hose assembly 12. Each such electrical cable may be shielded to prevent electromagnetic interactions between signals. By embedding electrical cables in the hose assembly, there is less chance that those assembly electrical cables will become tangled or cause damage. In addition, there is less need to run the electrical cables through the links, thereby reserving that space for other uses.

The surface of robot 10, including the surface of the links, the joints, or the links and the joints, may be made of a metal, such as aluminum. Movement of the hose assembly relative to the robot surface, as may occur when the hose assembly stretches, may cause damage to the hose assembly. Accordingly, the coefficient of static friction between the sleeve of the hose assembly and the robot may be relatively low in order to avoid, or to mitigate, damage to the hose assembly during operation of the robot. For example, the coefficient of static friction between the surface of the robot and the sleeve of the hose assembly may be less than 0.5, less than 0.4, less than 0.3, less than 0.2, or less than 0.1. In other words, the material out of which the sleeve of the hose assembly is made may be selected so that the coefficient of static friction between the surface of the robot and the sleeve of the hose assembly is less than 0.5, less than 0.4, less than 0.3, less than 0.2, or less than 0.1.

The hose assembly may include a terminus fitting at each of its two ends. One terminus fitting may include a connector configured for connection to the vacuum source. One terminus fitting may include a connector configured for connection to the end effector of the robot. For example, the connector may connect to a slip ring device fixed to the most distal link. An example of a slip ring device is described with respect to FIGS. 8 to 9. In an example, the connector may connect to a vacuum cup, a vacuum fixture, or any appropriately-configured vacuum actuated gripping device operating as the end effector. In this regard, examples of vacuum fixtures 31 for holding a device using vacuum pressure are shown in FIG. 10, Referring back to FIGS. 2 to 5, robot 10 includes guides 33, 34 along at least some of the links. Although two guides are shown, fewer guides or additional guides may be included. The guides may also be connected to the joints, although that is not shown in the figures. The guides may be configured to hold the hose assembly fully or partly against the links while permitting the hose assembly to stretch or to move to accommodate movements of a joint, a link, or both a joint and a link. For example, the guides may be or include Velcro® straps (shown) to hold the hose assembly at least partially flush against the robot or multiple metal or plastic loops (not shown) through which the hose assembly threads. In general, the guides maintain the hose assembly in position against the robot while still allowing movement of the hose assembly relative to the robot, particularly as the hose assembly stretches during robot movement.

As noted, FIGS. 1 to 5 show the same example robot 10 in different poses. These poses are merely examples of the many poses that robot 10 is capable of achieving through rotation of various joints. In each pose, hose assembly 12 stretches differently, while the guides—Velcro® straps in this example—allow the hose assembly to stretch longitudinally. Because the elasticity of the hose assembly is greater in its longitudinal dimension than in its lateral dimension, the stretching does not affect, or does not have a significant deleterious effect on, the vacuum pressure delivered to the end effector by the hose assembly.

Figure 8:
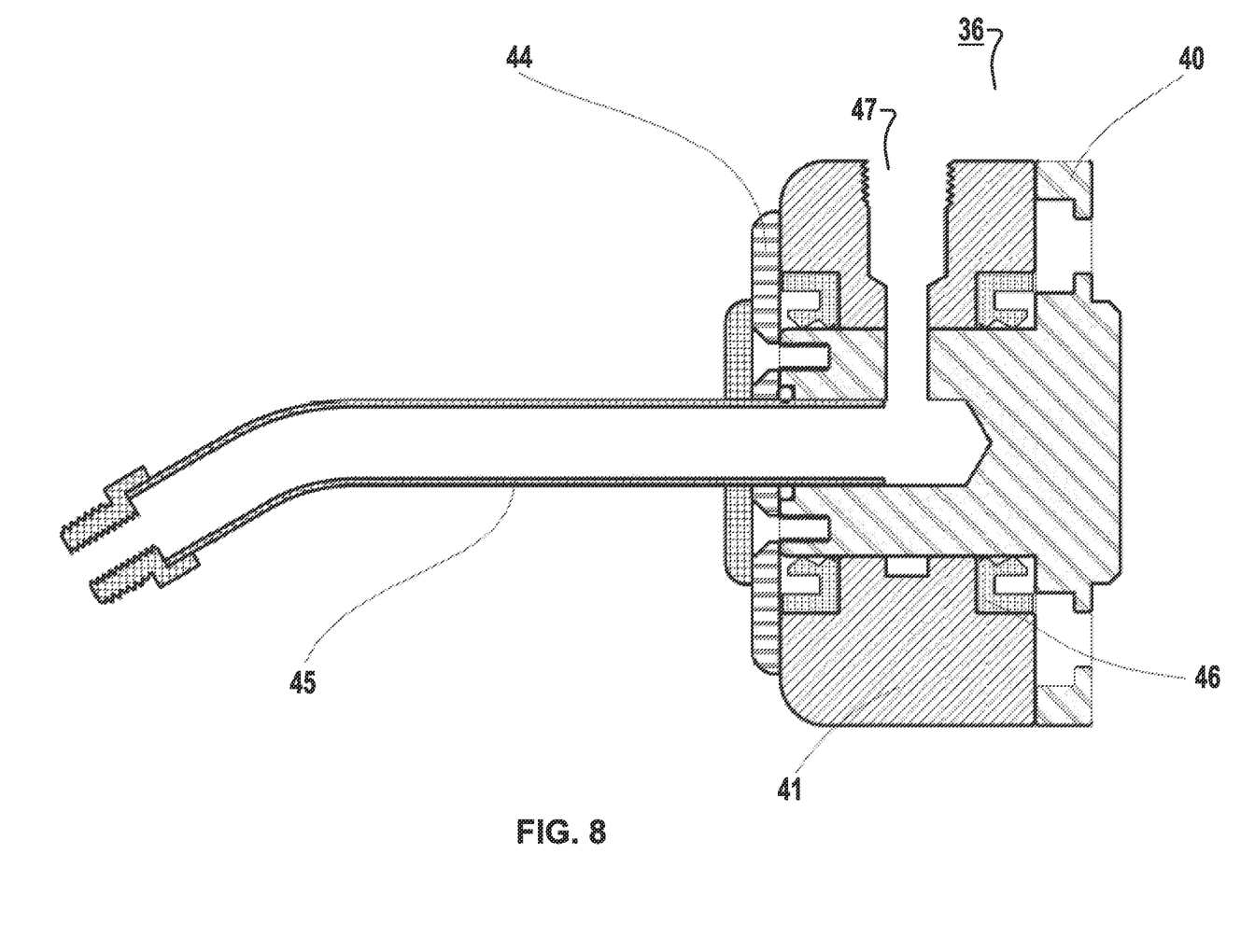
FIG. 8 is a cut-away side view of an example slip ring end effector.
Figure 9:
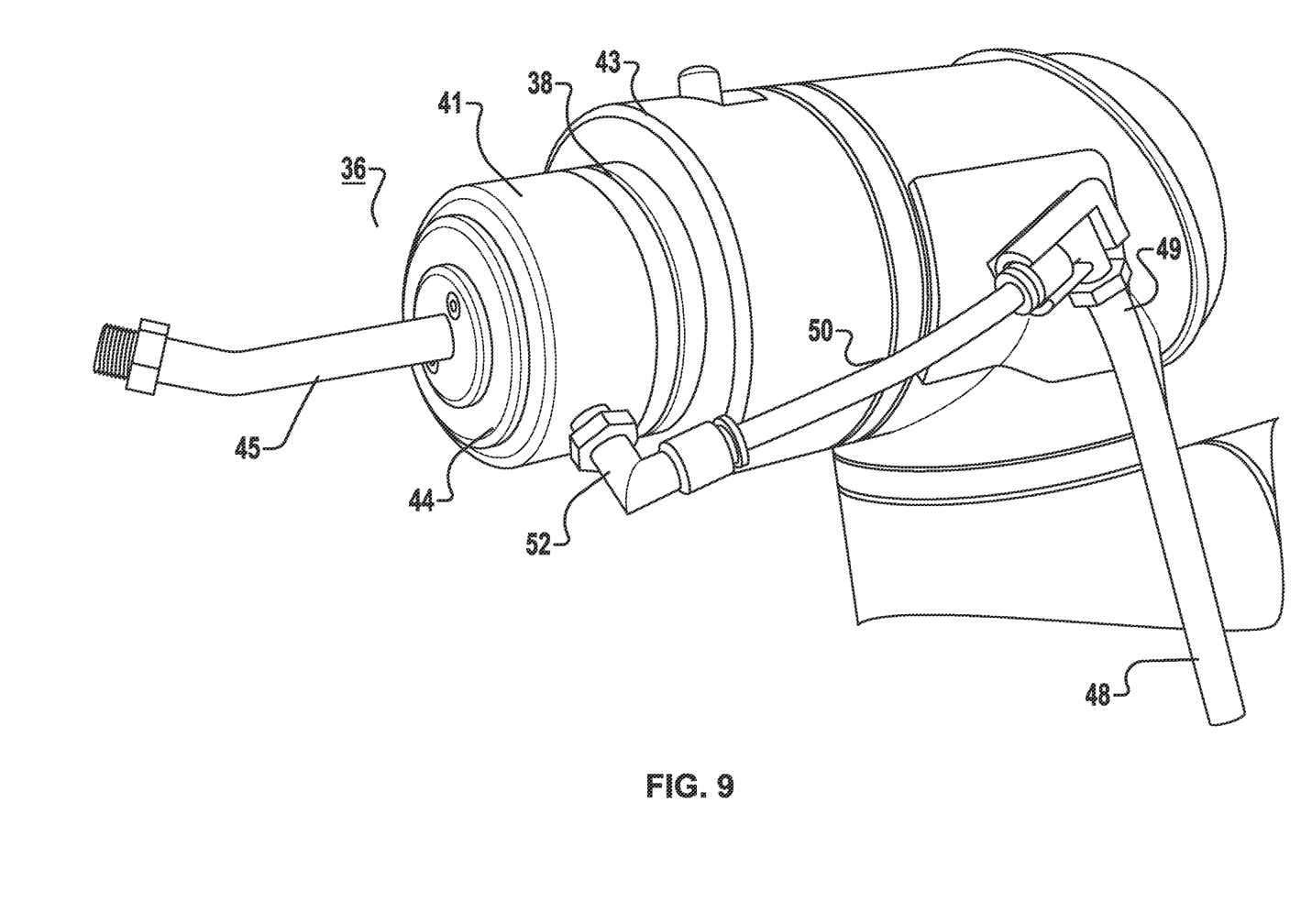
FIG. 9 is a perspective view of the example slip ring end effector.
Figure 10:
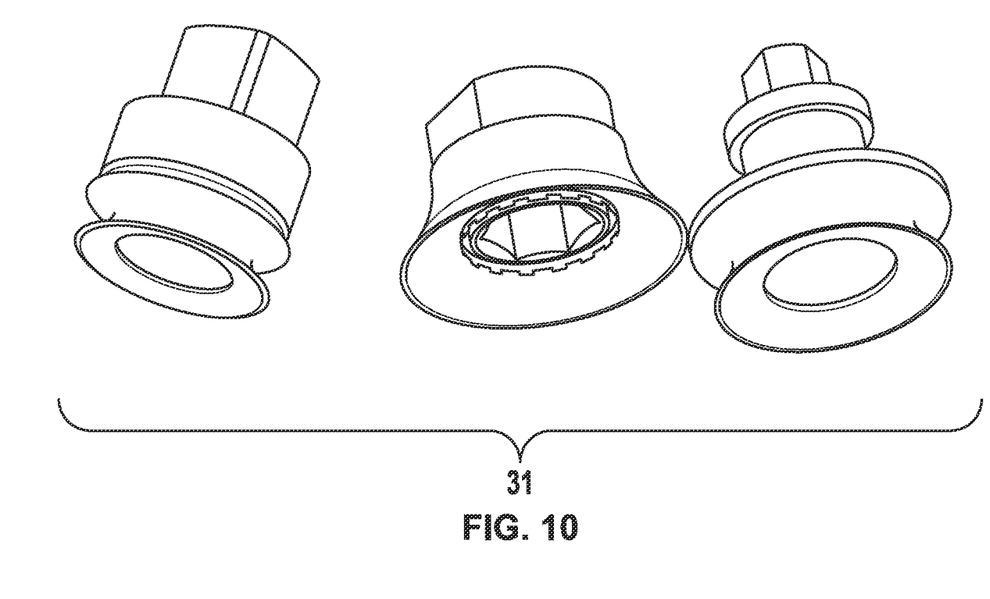
FIG. 10 is a perspective view of an example vacuum fixture end effector.

FIGS. 8 and 9 show an example end effector, namely slip ring device 36. Slip ring device 36 is connected to the distal component 43 of a robot of the type shown in FIGS. 1 to 5. Referring to FIGS. 8 to 9, example slip ring device 36 is mounted to a robot tool flange 38 on component 43. Device 36 includes a fixed element 40 that is configured not to rotate relative to the flange but to rotate when the link connected to the flange, and thus also the flange, rotates. Device 36 also includes a rotary element 41 that is configured to rotate relative to fixed element 40 around its centerline and, thus, relative to the flange. Device 36 also includes a locking flange element 44 that retains the fixed element to the rotary element and a rigid tubing section 45 that rotates along with the flange and that provides a mounting feature for a vacuum cup, a vacuum fixture, or a vacuum actuated gripping device. A receptacle 47 is configured to mate to a mechanical connection 52 between the slip ring device and connective tubing 50. A connection mechanism 49 connects tubing 50 to hose assembly 48, which may be the same as hose assembly 12. Rigid tubing section 45 or slip ring device 36 can be removed to suit different robotic bin picking applications and conditions.

In an example operation, distal component 43 rotates during operation of the robot. Because fixed element 40 is connected to the link's flange, this rotation causes fixed element 40 and also rigid tubing section 45 to rotate with the link. During this rotation, however, rotary element 41 rotates freely relative to the fixed element and thus, the link. As a result of its rotation, the rotary element can maintain about the same mechanical connection 52 to the pneumatic hose assembly 48 regardless of rotational angle. For example, the amount that connective tubing 50 stretches, and the amount that the hose assembly stretches longitudinally may be reduced or minimized in this part of the robot.

Slip ring device 36 may include one or more sealing elements 46 configured and arranged to address vacuum leaks within the slip ring device. The sealing element types can vary in terms of numbers, types, and locations. The sealing elements may include, for example, O-rings, X-rings, lip seals, or spring-loaded lip seals, and the like. Sealing element base points can be located on either the slip ring fixed element, on the rotary element, or on both fixed element and rotary element.

In this example, slip ring device 36 also includes one or more of bearings, dry film lubricant coating, or both one or more bearings and dry film lubricant between rotary element 41 and fixed element 40 to support rotation of rotary element 41 relative to fixed element 41. Coatings on the metal surfaces may also reduce friction and increase wear. The bearing may include metal bearings, polymer bearings, polymer elements, or a combination of two or more such components.

Rigid tubing section 45 may vary in length, shape, and/or mounting style. The distal end mounting feature can be configured to accommodate an assortment of vacuum cups styles, shapes, and mounting options. As noted, slip ring device 36 also receptacle 47 for mating to a connector 52, through which vacuum pressure from the hose assembly is delivered to the rigid tubing section.

As explained herein, the pneumatic hose assembly and slip ring device are not limited to use with robots of the type shown in FIGS. 1 to 5. For example, the pneumatic hose assembly and slip ring device may be used with robots that move translationally at least in part including, but not limited to, telescopic movement, sliding movement, or linear movement. For example, a robot may have a link or an end effector connected to a joint or one or more other movable mechanisms that allow the link or the end effector to move translationally. In some implementations, the translational movement may be in combination with rotational movement. In any case, the movement results in the hose assembly stretching as described herein. The different elasticities of the hose assembly along its longitudinal and lateral dimensions may, in some implementations, enable the hose assembly to deliver consistent vacuum pressure to the end effector while reducing damage caused by tangling or unwanted hose assembly movement.

The example robots described herein may be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any mechanical or electrical connection herein may include a direct physical connection or an indirect connection that includes intervening components.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A robot comprising:
   links comprising a first link and a second link;
   joints among the links, a joint being between the first link and the second link to enable relative movement between the first link and the second link;
   an end effector connected in series with one of the joints; and
   a hose assembly connected to the end effector, the hose assembly comprising:
      a hose having a first end for making connection to a vacuum source and a second end for making connection between the first end and the end effector;
   wherein the end effector comprises
      rigid tubing; and
      a slip ring assembly connected to a flange that is connected to the one of the joints, the slip ring assembly being around at least part of the rigid tubing, the slip ring assembly comprising:
         a tool flange mount connected to the flange;
         a slip ring configured to enable rotation between the slip ring and the tool flange mount around a center line of the tool flange mount, the slip ring being connected to the robot via part of the hose assembly; and
         the slip ring assembly being configured for connection to the hose assembly to produce vacuum in the rigid tubing.

2. The robot of claim 1,
   wherein the hose assembly has a cross-section and has a length between the first end and the second end, and wherein an elasticity of the hose assembly is greater along the length of the hose assembly than along the cross-section of the hose assembly;
   wherein the links and the joints are comprised of one or more first materials and the hose assembly is comprised of a second material on an outer surface of the hose assembly; and
   wherein a coefficient of static friction between the one or more first materials and the second material is less than 0.5.

3. The robot of claim 2, wherein the hose assembly comprises an electrical cable embedded therein, the electrical cable having an elasticity that is at least as great as the elasticity of the length of the hose.

4. The robot of claim 2, further comprising:
   guides along at least some of the links, the guides being configured to hold the hose assembly at least partly against the links while permitting the hose assembly to stretch to accommodate movements of a joint, a link, or both a joint and a link.

5. The robot of claim 2, wherein the joint is configured for rotation to cause at least partial rotation of the first link relative to the second link, the at least partial rotation causing the hose assembly to stretch.

6. The robot of claim 2, wherein the joint is configured to cause the first link to move translationally relative to the second link, where translational movement of the first link relative to the second link causes the hose assembly to stretch.

7. The robot of claim 6, wherein the translational movement comprises at least one of telescopic movement, sliding movement, or linear movement.

8. The robot of claim 2; wherein an elasticity of the hose assembly along the length is such that the hose assembly, when stretched, can double in length from a relaxed position.

9. The robot of claim 2, further comprising:
   the vacuum source, the vacuum source being controlled, and the hose assembly being configured, to provide substantially constant pressure to the end effector.

10. The robot of claim 2, wherein the end effector comprises a vacuum cup, a vacuum fixture, or a vacuum actuated gripping device.

11. The robot of claim 2, wherein the coefficient of static friction between the one or more first materials and the second material is less than 0.4.

12. The robot of claim 2, wherein the coefficient of static friction between the one or more first materials and the second material is less than 0.3.

13. The robot of claim 2, wherein the coefficient of static friction between the one or more first materials and the second material is less than 0.2.

14. The robot of claim 2, wherein the hose is an inner layer comprised of rubber; and
   wherein the hose assembly further comprises an outer layer that surrounds the hose, where a coefficient of static friction between the inner layer and the outer layer is within 5% of one.

15. The robot of claim 14, wherein the outer layer comprises at least one of spandex or nylon.

16. The robot of claim 2, wherein the hose assembly comprises a sleeve around the hose, the sleeve and the hose being comprised of different materials; and
   wherein the sleeve comprises the outer surface of the hose assembly.

17. The robot of claim 2, wherein the hose assembly further comprises an outer layer over the hose, the outer layer comprising the outer surface; and
   wherein the hose comprises at least one of: a coiled support structure, braided elastomer, parallel elastomer, or a stretch tubing having a thickness configured so as not to collapse under atmospheric pressure when vacuum is applied to the stretch tubing.

18. The robot assembly of claim 17, wherein the outer layer comprises a stretch fabric sleeve that surrounds an entire length of the hose.

19. The robot assembly of claim 17, wherein the hose assembly further comprises terminus fittings at the first end and the second end.

20. The robot of claim 2, wherein the coefficient of static friction between the one or more first materials and the second material is less than 0.1.

21. The robot of claim 1, wherein the links and the joints are comprised of one or more first materials and the hose assembly is comprised of a second material; and
   wherein a coefficient of static friction between the one or more first materials and the second material is less than 0.2.

22. The robot of claim 1, wherein the slip ring assembly, comprises a retainer to hold the tool flange mount and the slip ring to the flange.

23. The robot of claim 1, wherein the slip ring assembly comprises one or more sealing elements to seal vacuum leaks within the slip ring assembly.

24. The robot of claim 1, wherein the slip ring assembly comprises one or more of bearings or dry film lubricant coating between the tool flange mount and the slip ring.

* * * * *